United States Patent
Eckl et al.

(10) Patent No.: US 12,060,444 B2
(45) Date of Patent: Aug. 13, 2024

(54) CONTINUOUS AND MODULAR PROCESS FOR PRODUCING WATER-REDISPERSIBLE POLYMER POWDER COMPOSITIONS

(71) Applicant: WACKER CHEMIE AG, Munich (DE)

(72) Inventors: Bernhard Eckl, Burghausen (DE); Michael Kalchauer, Burghausen (DE); Jessica Seidel, Zangberg (DE); Hans-Peter Weitzel, Reischach (DE)

(73) Assignee: WACKER CHEMIE AG, Munich (DE)

( * ) Notice: Subject to any disclaimer, the term of this patent is extended or adjusted under 35 U.S.C. 154(b) by 1303 days.

(21) Appl. No.: 16/471,554

(22) PCT Filed: Dec. 21, 2016

(86) PCT No.: PCT/EP2016/082191
§ 371 (c)(1),
(2) Date: Jun. 19, 2019

(87) PCT Pub. No.: WO2018/113955
PCT Pub. Date: Jun. 28, 2018

(65) Prior Publication Data
US 2020/0270374 A1  Aug. 27, 2020

(51) Int. Cl.
*C08F 2/01* (2006.01)
*C08F 2/22* (2006.01)
*C08J 3/12* (2006.01)

(52) U.S. Cl.
CPC .................. *C08F 2/22* (2013.01); *C08F 2/01* (2013.01); *C08J 3/122* (2013.01)

(58) Field of Classification Search
CPC .............. C08J 3/122; C08F 2/01; C08F 2/22
See application file for complete search history.

(56) References Cited

U.S. PATENT DOCUMENTS

| | | | |
|---|---|---|---|
| 4,481,328 A | 11/1984 | Harreus et al. | |
| 5,777,003 A | 7/1998 | Haas et al. | |
| 6,084,018 A | 7/2000 | Wildburg et al. | |
| 7,820,738 B2 | 10/2010 | Pietsch et al. | |
| 8,984,765 B2 | 3/2015 | Herbert et al. | |
| 9,334,388 B2 | 5/2016 | Killat | |
| 2002/0035192 A1 | 3/2002 | Weitzel | |
| 2010/0081736 A1 | 4/2010 | Willimann et al. | |
| 2011/0160350 A1 | 6/2011 | Bergman et al. | |
| 2011/0213073 A1 | 9/2011 | Weitzel et al. | |
| 2014/0167299 A1 | 6/2014 | Herbert et al. | |

FOREIGN PATENT DOCUMENTS

| | | |
|---|---|---|
| EP | 0056622 B1 | 7/1986 |
| EP | 0838509 B1 | 3/2003 |
| EP | 1174445 B1 | 10/2003 |
| EP | 1916275 B1 | 5/2012 |
| EP | 2341084 81 | 2/2015 |
| EP | 2739673 B1 | 10/2015 |
| WO | 05080478 A1 | 9/2005 |
| WO | 13017463 A1 | 2/2013 |

OTHER PUBLICATIONS

Ye, Yunkun et al., Investigation report on PVC production technology in Yugoslavia, Polyvinyl Chloride, supplementary issue of No. 4, pp. 1, 48-49, Dec. 31, 1981.
J. Schulze, Redispersionspulver im Zement, TIZ-Fachberichte Wacker Chemie GmbH, vol. 109 (9), 1985, 698-703, Burghausen, Germany.
T.G. Fox, Influence of Diluent and of Copolymer Composition and the Glass Temperature of a Polymer System, Session J5, Bulletin of American Physics Society 1, 3, p. 123 (1956).
Encyclopedia of Polymer Science and Engineering, vol. 8 (1987), Identification to Lignin, Synthetic Latices, pp. 659-677, John Wiley and Sons, New York (US).
J. Brandrup, E.H. Immergut, Polymer Handbook, 2nd Edition, 1975, John Wiley and Sons, New York (US).

*Primary Examiner* — Marc S Zimmer
*Assistant Examiner* — Jeffrey S Lenihan
(74) *Attorney, Agent, or Firm* — BROOKS KUSHMAN P.C.

(57) ABSTRACT

The invention relates to a method for producing polymer powder compositions which are redispersible in water and which are based on polymerisates of one or more ethylenically unsaturated monomers. In a first step, an aqueous polymerisate dispersion is produced by means of a radically initiated polymerization of one or more ethylenically unsaturated monomers in an aqueous medium, said polymerisate dispersion being convened into the polymer powder composition which is redispersible in water by means of a diving process. The invention is characterized in that the polymerization and the drying process are each carried out in a continuous manner, and the polymerization and the diving process are carried out in separate interconnected modules.

6 Claims, 1 Drawing Sheet

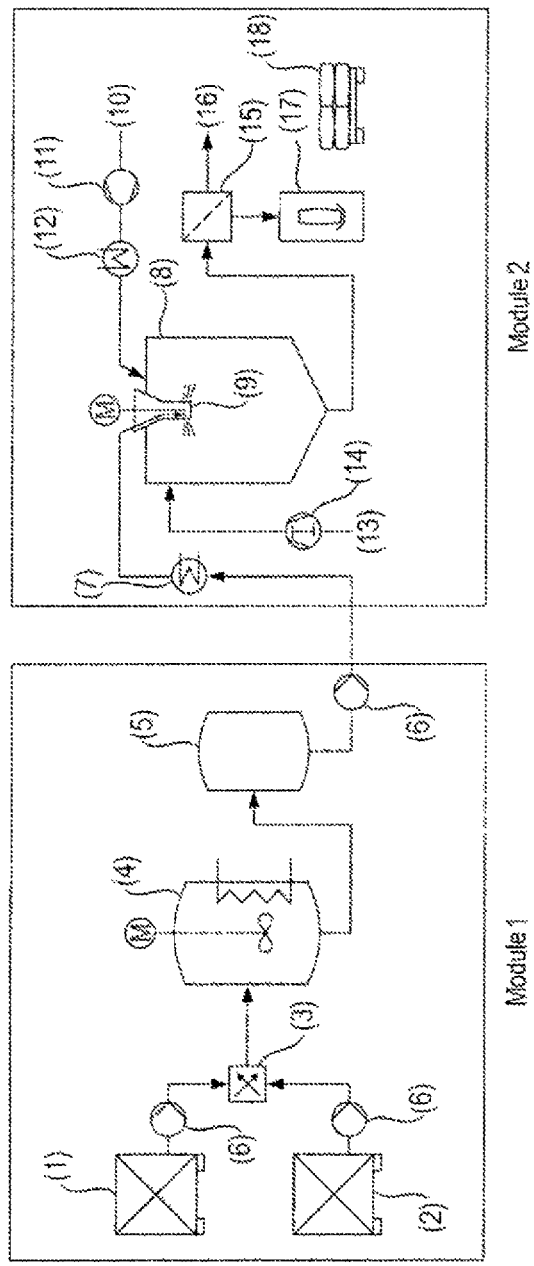

CONTINUOUS AND MODULAR PROCESS FOR PRODUCING WATER-REDISPERSIBLE POLYMER POWDER COMPOSITIONS

CROSS-REFERENCE TO RELATED APPLICATIONS

This application is a U.S. National Phase Application of PCT/EP2016/082191, filed Dec. 21, 2016 the contents of which are incorporated herein by reference in their entireties for all purposes.

FIELD OF THE INVENTION

The invention relates to a continuous and modular process for producing polymer powder compositions which are redispersible in water and to a modular apparatus for carrying out said process.

BACKGROUND OF THE INVENTION

Polymer powder compositions which are redispersible in water (dispersion powders) are generally produced by drying the corresponding aqueous dispersion of a base polymer. The aqueous dispersion of the base polymer is preferably produced by means of radically initiated emulsion polymerization of one or more ethylenically unsaturated monomers. The aqueous dispersion of the base polymer thus obtained is then dried, preferably in the presence of a drying aid (generally a protective colloid), for example by spray-drying. During or after the drying process, antiblock agents or further additives may optionally be added. Firstly, during the drying procedure, the irreversible adhesion of the polymer particles is prevented due to the protective colloid proportion since the polymer particles are coated by the protective colloid particles. Secondly, this protective colloid matrix, which dissipates again on dispersion of the polymer powder composition in water, results in the polymer particles being present again with the particle size of the starting dispersion in the aqueous (re)dispersion (TIZ-Fachberichte, 1985, Vol. 109 (9), 698).

Such dispersion powders are used in all kinds of applications, inter alia, in coating compositions and in adhesives for a wide variety of substrates. Widespread is the use of polymer powder compositions which are redispersible in water in construction chemical products, frequently in conjunction with mineral binders (Vinnapas® powder from Wacker Chemie AG). Examples of these are construction adhesives, especially tile adhesives, plaster and mortar compositions, paints, knifing fillers, leveling compounds, composite thermal insulation systems and jointing mortars. The advantage of polymer powder which is redispersible in water is particularly the possibility of using them in pre-manufactured, storable dry mixtures, optionally together with mineral binders such as cement, and to make these ready for use by addition of water directly just prior to use. Such dry mixtures can be more readily transported (without water content) compared to paste-like systems and offer advantages during storage, such as insensitivity to frost for example and resistance to microbial infestation.

Processes for producing polymer powder compositions which are redispersible in water have been described many times and are known to those skilled in the art:

EP 0 056 622 B1 describes polymer powder compositions which are redispersible in water, which are produced by spray-drying of an aqueous polymer dispersion with addition of hydrophobic silica. EP 1 174 445 A1 describes a process for producing polymers, stabilized by protective colloids, by continuous polymerization. The polymer dispersions thus obtained can be dried to give dispersion powders. EP 2 341 084 A1 describes the production of polymer powder compositions which are redispersible in water, in which a polymer dispersion is dried in the presence of chelating agents. A process for producing dispersion powders is known from EP 2 739 673 B1 in which an aqueous polymer dispersion is dried in a rotary atomizer dryer. WO 2005/080478 describes a process for producing polymer powders which are readily redispersible in water by means of spray-drying in the presence of a specific spray-drying aid. WO 2013/017463 A1 describes a process for producing dispersion powders by spray-drying aqueous polymer dispersions with addition of antiblock agents.

In the processes to date for producing polymer powder compositions which are redispersible in water, in a first step an aqueous polymer dispersion was produced in batchwise mode or continuously. The polymer dispersion was stored in a tank and fed batchwise to the spray-drying process. Prior to the spray-drying, additives such as drying aids were added to the polymer dispersion. Subsequently, this preparation was fed as feed to the dryer and the water removed by spray-drying.

BRIEF SUMMARY OF THE INVENTION

The object was to provide a process and to provide an apparatus for carrying out this process, with which dispersion powders are accessible in variable amounts and without variations in quality with the lowest possible specific investment costs (investment costs based on product amount).

The invention relates to a process for producing polymer powder compositions which are redispersible in water and which are based on polymers of one or more ethylenically unsaturated monomers, wherein in a first step an aqueous polymer dispersion is produced by means of radically initiated polymerization of one or more ethylenically unsaturated monomners in an aqueous medium, said polymer dispersion being converted to the polymer powder composition which is redispersible in water by means of a drying process, characterized in that the polymerization and the drying process are each carried out continuously, and the polymerization and the drying process are carried out in separate interconnected modules.

In the context of the invention, continuous signifies that in the process having at least two process steps in series, in the first process step, preferably the polymerization, reactant is fed continuously and an aqueous product stream is conveyed continuously to a downstream step, preferably the drying process, and finally the pulverulent product is continuously removed.

In the context of the invention, modular signifies that the individual steps of the process according to the invention are carried out in separate interconnected modules, in which the modules can be pre-configured and closed. Examples of modules in the context of the invention are a polymerization module and a drying module.

The interconnected modules of the process are each preferably transportable units or are assembled from transportable units, which can be transported to a desired production site, at which an appropriately equipped production plant should be established. The modules preferably have a casing in order to enable simple transport thereof.

At a production site, the modules can be connected, preferably via standardized couplings, to a local, permanently installed supply network/disposal network, with} which the modules can be supplied with substances (reactants for example) and/or energy and/or from which the substances (for example products, waste) can be dispensed, such that a continuous production can be carried out by means of the linked modules.

Additionally or alternatively, within the casing of a module, one or more reservoirs for liquid, solid and/or gaseous substances connectable to a local supply network can be provided. The modules may have, for example, installations for filling, emptying, heating, cooling, mixing, separating, aerating and/or ventilating, which enable the polymerization or the drying process to be carried out.

Each module can have a control or regulation device, via which the respective module can be controlled and/or regulated for carrying out a particular process step of the production.

BRIEF DESCRIPTION OF THE DRAWINGS

The figure is a schematic view of the inventive process and apparatus for carrying out the invention.

DETAILED DESCRIPTION OF PREFERRED EMBODIMENTS

In a preferred embodiment, the process according to the invention is operated with an apparatus which is equipped with a polymerization module and a downstream drying module. Additional modules may comprise control or infrastructure elements, if these are not permanently installed locally or are included in the aforementioned modules.

The polymerization module is preferably equipped with pipelines for feeding reactants and preferably with storage containers (tanks) for temporary storage of the reactants. Advantageously, there are also devices with which various reactants can be pre-mixed and this can then be fed as a mixture to the polymerization. For the polymerization, common devices for continuous polymerization can be used. The polymerization module as polymerization reactor can be equipped, for example, with a stirred tank or two or more stirred tanks arranged in series, or be equipped with one or more tubular reactors arranged in series, which are each equipped with heating and cooling devices and are each equipped with a device for mixing the polymerization batch. The reactants or mixtures thereof are fed to the polymerization reactor via pipelines. The polymerization product, the aqueous polymer dispersion, after completion of the polymerization, is preferably fed using a pipeline, batchwise or continuously, to the drying module.

The drying module is preferably equipped with a spray-dryer for drying the aqueous polymer dispersion. This is generally a cylindrical container with nozzles or with an atomizer disk for feeding the polymer dispersion. In a preferred embodiment, the drying module is equipped with a reservoir, which is arranged prior to the spray-dryer and asynchronicities during the operation of the polymerization module and the drying module can be smoothed out. The drying module also comprises devices for feeding and heating the drying air, as well as storage containers and/or pipelines for feeding additives for the drying process, for example drying aids, antiblock agents or defoamers. Further devices in the drying module are preferably filters and collecting devices to obtain the dry polymer powder. The drying module preferably also comprises devices for packing the polymer powder, such as bagging in small containers or big bags.

Using the process according to the invention, polymer powders which are redispersible in water can be produced based on customary polymers for this purpose:

To produce the polymers, suitable ethylenically unsaturated monomers are those from the group comprising vinyl esters of carboxylic acids having 1 to 15 carbon atoms, methacrylic esters, acrylic esters of carboxylic acids with unbranched or branched alcohols having 1 to 15 carbon atoms, olefins, dienes, vinyl aromatics and vinyl halides.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having 5 to 13 carbon atoms, for example VeoVa9® or VeoVa10® (trade names of Momentive). Particular preference is given to vinyl acetate.

Preferred methacrylic esters or acrylic esters are esters of unbranched or branched alcohols having 1 to 15 carbon atoms such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Particular preference is given to methyl acrylate, methyl methacrylate, n-butyl acrylate and 2-ethylhexyl acrylate.

Preferred olefins or dienes are ethylene, propylene and 1,3-butadiene. Preferred vinyl aromatics are styrene and vinyltoluene. A preferred vinyl halide is vinyl chloride.

Optionally, 0.1 to 10% by weight, based on the total weight of the polymer, can also be co-polymerized in each case with one or more comonomers. Examples of comonomers are ethylenically unsaturated mono- and dicarboxylic acids, ethylenically unsaturated carboxamides, ethylenically unsaturated sulfonic acids or salts thereof, precrosslinking comonomers such as multiply ethylenically unsaturated comonomers, postcrosslinking comonomers such as N-methylol acrylamide, epoxide-functional comonomers, silicon-functional comonomers.

Preferably, vinyl acetate and mixtures of vinyl acetate are polymerized with 1 to 40% by weight ethylene;

mixtures of vinyl acetate with 1 to 50% by weight of one or more further comonomers from the group of vinyl esters having 1 to 12 carbon atoms in the carboxylic acid radical such as vinyl propionate, vinyl laurate, vinyl esters of alpha-branched carboxylic acids having 5 to 13 carbon atoms such as VeoVa9®, VeoVa10®, VeoVa11®;

mixtures of vinyl acetate with 1 to 40% by weight ethylene and 1 to 50% by weight of one or more further comonomers from the group of vinyl esters having 1 to 12 carbon atoms in the carboxylic acid radical such as vinyl propionate, vinyl laurate, vinyl esters of alpha-branched carboxylic acids having 5 to 13 carbon atoms such as VeoVa9®, VeoVa10®, VeoVa11®; mixtures of vinyl acetate, 1 to 40% by weight ethylene and preferably 1 to 60% by weight (meth)acrylic esters of unbranched or branched alcohols having 1 to 15 carbon atoms, especially methyl methacrylate, methyl acrylate, n-butyl acrylate or 2-ethylhexyl acrylate;

mixtures of 30 to 75% by weight vinyl acetate, 1 to 30% by weight vinyl laurate or vinyl esters of an alpha-branched carboxylic acid having 5 to 13 carbon atoms, and also 1 to 30% by weight (meth)acrylic esters of unbranched or branched alcohols having 1 to 15 carbon atoms, especially methyl methacrylate, methyl acrylate, n-butyl acrylate or 2-ethylhexyl acrylate, which may also comprise 1 to 40% by weight ethylene;

mixtures of one or more vinyl esters having 1 to 12 carbon atoms in the carboxylic acid radical such as vinyl acetate, vinyl propionate, vinyl laurate, vinyl esters of alpha-branched carboxylic acids having 5 to 13 carbon atoms such as VeoVa9®, VeoVa10®, VeoVa11®, 1 to 40% by weight ethylene and 1 to 60% by weight vinyl chloride;

wherein in each case the comonomers specified can be copolymerized in the amounts specified, and the figures in % by weight in each case add up to 100% by weight.

Preferably, mixtures of methyl methacrylate are also polymerized with n-butyl acrylate and/or 2-ethylhexyl acrylate and optionally ethylene;

mixtures of styrene with one or more monomers from the group comprising methyl acrylate, ethyl acrylate, propyl acrylate, n-butyl acrylate, 2-ethylhexyl acrylate;

mixtures of styrene with 1,3-butadiene;

wherein the mixtures in each case can also comprise the comonomers specified in the amounts specified, and the figures in % by weight in each case add up to 100% by weight.

The monomer and the proportion by weight of the comonomers are selected preferably such that a glass transition temperature Tg of the polymers of −20° C. to +40° C., preferably −20° C. to +20° C. results. The glass transition temperature Tg of the polymers can be determined in a known manner by differential scanning calorimetry (DSC) in accordance with DIN 53520. The Tg can also be predicted approximately by means of the Fox equation.

According to Fox T. G., Bull. Am. Physics Soc. 1, 3, page 123 (1956): $1/Tg=x1/Tg1+x2/Tg2+\ldots+xn/Tgn$, where xn is the mass fraction (% by weight/100) of the monomer n, and Tgn is the glass transition temperature in Kelvin of the homopolymers of the monomer n. Tg values for homopolymers are listed in Polymer Handbook 2nd Edition, J. Wiley & Sons, New York (1975).

The preparation of aqueous polymer dispersions has been described many times before and is known to those skilled in the art; for example in Encyclopedia of Polymer Science and Engineering, Vol. 8 (1987), John Wiley and Sons, pp. 659-677; and for example in EP 1916275 A1.

The polymer dispersion is preferably produced by the emulsion polymerization process. The polymerization temperature is preferably from 40° C. to 120° C., particularly preferably from 60° C. to 90° C. In the case of copolymerization of gaseous comonomers such as ethylene, 1,3-butadiene or vinyl chloride the process can also be operated under pressure, in general from 5 bar to 100 bar.

The polymerization is preferably initiated with water-soluble initiators common in emulsion polymerization, preferably with redox-initiator combinations.

The polymerization is effected in the presence of protective colloid, optionally in combination with emulsifiers. Suitable protective colloids for the polymerization are polyvinyl alcohols; polyvinyl acetals; polyvinylpyrrolidones; polysaccharides in water-soluble form such as starches (amylose and amylopectin), celluloses and carboxymethyl, methyl, hydroxyethyl and hydroxypropyl derivatives thereof, dextrins and cyclodextrins; proteins such as casein or caseinate, soya protein, gelatine; lignin sulfonates; synthetic polymers such as poly(meth)acrylic acid, copolymers of (meth)acrylates with carboxy-functional comonomer units, poly(meth)acrylamide, polyvinylsulfonic acids and water-soluble copolymers thereof; melamine formaldehyde sulfonates, naphthalene formaldehyde sulfonates, styrene-maleic acid and vinyl ether-maleic acid copolymers.

Preference is given to using partially saponified or fully saponified polyvinyl alcohols having a degree of hydrolysis of 80 to 100 mol %, especially partially saponified polyvinyl alcohols having a degree of hydrolysis of 80 to 95 mol % and a Höppler viscosity, in 4% aqueous solution, of 1 to 30 mPas (method according to Höppler at 20° C., DIN 53015). The protective colloids are generally added during the polymerization in an amount from 0.5 to 30% by weight, based on the total weight of the monomers.

If polymerization takes place in the presence of emulsifiers, the amount thereof is 1 to 5% by weight, based on the total amount of the monomers. Suitable emulsifiers are both anionic and cationic as well as non-ionic emulsifiers, for example anionic surfactants such as alkyl sulfates having a chain length of 8 to 18 carbon atoms, alkyl- or alkylaryl ether sulfates having 8 to 18 carbon atoms in the hydrophobic radical and up to 40 ethylene oxide or propylene oxide units, alkyl- or alkylaryl sulfonates having 8 to 18 carbon atoms, esters and semi-esters of sulfosuccinic acid with monovalent alcohols or alkylphenols, or non-ionic surfactants such as alkyl polyglycol ethers or alkylaryl polyglycol ethers having 8 to 40 ethylene oxide units.

To reduce the residual monomer content after completion of the polymerization, post-polymerization can be carried out using known methods, generally by post-polymerization initiated by a redox catalyst. Volatile residual monomers can also be removed by distillation, preferably under reduced pressure, and optionally by passing through or passing over inert entrainment gases such as air, nitrogen or steam. For this purpose, preference is given to using continuous flow-through reactors and apparatuses known to those skilled in the art.

The aqueous polymer dispersions thus obtained have a solids content of 30 to 75% by weight, preferably 40 to 60% by weight, particularly preferably 45 to 55% by weight. In the preferred embodiment, the polymer dispersions have a viscosity suitable for subsequent drying of 10 to 3000 mPas, preferably 100 to 500 mPas (Brookfield viscosity Bf20 using Brookfield viscometer at 23° C. and 20 rpm).

In a further preferred embodiment, the aqueous polymer dispersions thus obtained, after completion of the polymerization, already comprise the required protective colloid as drying aid. Preferably, therefore, no further protective colloids are added to the aqueous polymer dispersion prior to the drying process.

To produce the dispersion powder, the aqueous polymer dispersions, optionally after further addition of protective colloid to the polymer dispersion as drying aid, are dried by spray-drying. Suitable drying aids are the substances listed above as protective colloids: polyvinyl alcohols; polyvinyl acetals; polyvinylpyrrolidones; polysaccharides in water-soluble form such as starches (amylose and amylopectin), celluloses and carboxymethyl, methyl, hydroxyethyl and hydroxypropyl derivatives thereof, dextrins and cyclodextrins; proteins such as casein or caseinate, soya protein, gelatine; lignin sulfonates; synthetic polymers such as poly(meth)acrylic acid, copolymers of (meth)acrylates with carboxy-functional comonomer units, poly(meth)acrylamide, polyvinylsulfonic acids and water-soluble copolymers thereof; melamine formaldehyde sulfonates, naphthalene formaldehyde sulfonates, styrene-maleic acid and vinyl ether-maleic acid copolymers. Preference is given to using partially saponified or fully saponified polyvinyl alcohols having a degree of hydrolysis of 80 to 100 mol %, especially partially saponified polyvinyl alcohols having a degree of hydrolysis of 80 to 95 mol % and in each case a Höppler viscosity, in 4% aqueous solution, of 1 to 30 mPas (method according to Höppler at 20° C., DIN 53015). The aqueous polymer dispersions prior to drying thereof generally comprise the drying aid (protective colloid) in a total amount of 0.5 to 30% by weight, based on the base polymer of the polymer dispersion.

Additional additives may be added to the polymer dispersion as further constituents of the dispersion powder in order to package the powder for certain applications. Examples of such additives are defoamers, hydrophobizing agents and rheological additives.

Spray-drying is effected by atomization in the spray-dryer, in which the energy for evaporation of the aqueous phase is conveyed by heat transfer from the drying gas to the polymer dispersion (feed) to be dried. The feed is generally fed to the nozzles by pumps. The drying process is effected by intimate mixing of the atomized polymer dispersion (feed) with the drying gas. Air is generally used as drying gas. To accelerate the drying process, the drying gas is pre-heated, preferably to an inlet temperature of 130° C. to 210° C. (hot air), particularly preferably to 150° C. to 190° C. The spray-drying is preferably effected by the co-current flow principle.

The polymer dispersion (feed) and the drying gas are fed at the upper end of the spray-dryer, generally a cylindrical container. The dryer outlet at the lower end of the spray-dryer may be configured differently, for example the dried polymer powder is discharged with the drying gas and is isolated by means of a filter separator and/or cyclone separator. The outlet temperature of the drying gas is preferably 45° C. to 120° C., depending on the plant, Tg of the polymer and the desired degree of drying.

The dispersion powder can also comprise antiblock agents. Suitable antiblock agents (anti-caking agents) are known to those skilled in the art, for example aluminum silicates such as kaolin, bentonite, fumed silica or precipitated silica, which may be optionally hydrophobized, talc, clays, light spar, carbonates such as calcium carbonate, magnesium carbonate and Ca/Mg carbonate, barium sulfate. It is also possible to use mixtures of antiblock agents. The antiblock agents are generally used in an amount of 0.1 to 30% by weight, preferably 2 to 30% by weight, particularly preferably 7 to 30% by weight, based in each case on the total weight of the polymeric constituents of the polymer dispersion to be atomized. In the case of fumed silica or precipitated silica 0.1 to 2% by weight are preferably used, based on the polymeric constituents of the polymer dispersion to be atomized. The proportion of the polymeric constituents of the polymer dispersion to be atomized is composed of the base polymer of the polymer dispersion and optionally the protective colloid proportion.

The antiblock agent is added preferably continuously and concurrently, but physically separated from the polymer dispersion (feed) to be atomized. For this purpose, the antiblock agent is conveyed in a conveying pipe into the drying tower preferably at the upper end by means of a carrier gas, generally air (carrier air), for the drying process. Optionally, the antiblock agent can also be completely or partially added to the finished dried polymer powder prior to or after the separation thereof from the drying gas.

The process according to the invention and an apparatus for carrying out the process according to the invention is illustrated using the figure as an example.

The process according to the invention is shown schematically in the figure. The apparatus comprises a module 1, the polymerization module, and a module 2, the drying module.

Module 1 is provided with a storage container 1, which is stocked with vinyl acetate monomer, and a storage container 2 for a master batch comprising the further constituents of the polymerization batch. Storage container 2 is kept stocked with a mixture of water, polyvinyl alcohol, initiators and buffer, in the amounts required for the polymerization. The contents of containers 1 and 2 are fed via pumps 6 to a mixer 3, and the mixture generated here is passed into the polymerization reactor 4.

When the polymerization vessel has been filled with the initial charge, the initial mixture is heated to a polymerization temperature of 70° C., which is maintained during the polymerization by cooling.

Subsequently, the polymer dispersion formed in polymerization reactor 4 is transferred continuously to the degassing vessel 5. During the polymerization, the amounts of reactant fed continuously to the reactor 4 via the mixer 3 correspond to the amounts which are fed to the degassing vessel 5.

The polymer dispersion is transferred from the degassing vessel 5 by a pump 6 to the module 2, the drying module, and is heated to a temperature of 90° C. by the heat exchanger 7. The polymer dispersion is introduced into the dryer 8 via an atomizing disk 9. Optionally, further protective colloid, polyvinyl alcohol for example, can be added as drying aid during the drying process via line 13 and pump 14. The air for atomizing the polymer dispersion is fed via line 10 and nozzle 11 to the atomizing disk 9 and heated with the heat exchanger 12.

The dry polymer powder is removed from the separator 15 and packaged in the packing device 17 into sacks 18. The moist drying air escapes via line 16.

In this procedure, in addition to the specific investment cost reduced by circa 30%, a dispersion powder is obtained with improved product quality, for example better redispersability.

The invention claimed is:

1. A modular, continuous process for producing a water redispersible polymer powder composition, comprising:
    providing a polymerization module and, in a first step, continuously producing an aqueous polymer dispersion by free radical initiated polymerization of one or more ethylenically unsaturated monomers selected from the group consisting of vinyl esters of carboxylic acids having 1 to 15 carbon atoms, methacrylic esters of branched or unbranched alcohols having 1 to 15 carbon atoms, acrylic esters of branched or unbranched alcohols having 1 to 15 carbon atoms, olefins, dienes, vinyl aromatics, ethylenically unsaturated mono- and dicarboxylic acids, ethylenically unsaturated carboxamides, ethylenically unsaturated sulfonic acids and salts thereof, multiply ethylenically unsaturated comonomers, N-methylol acrylamide, epoxide-functional comonomers and silicon-functional comonomers, in an aqueous medium in the polymerization module and before, during, or after the polymerization, adding at least one protective colloid;
    providing a separate drying module, and in a second step, continuously directing the aqueous polymer dispersion produced in the first step into the drying module without intermediate storage, and
    recovering a water redispersible polymer powder from said second step, wherein the polymerization polymer dispersion flows from the polymerization module into the drying module via a pipeline.

2. The process of claim 1, wherein the polymerization module and the drying module comprise separately transportable modules, each module individually optionally comprising one or more submodules.

3. The process of claim 2, wherein at least one module is contained within a casing to facilitate transport.

4. The process of claim 1, wherein the free radical initiated polymerization takes place in the presence of a protective colloid, and an emulsifier.

5. The process of claim 4, wherein the protective colloid is present in such an amount that no further protective colloid is added to the aqueous polymer dispersion produced in the first step, prior to drying in the second step.

6. The process of claim 1, wherein the protective colloid(s) is/are selected from the group consisting of polyvinyl alcohols.

* * * * *